(12) United States Patent
Sekimoto et al.

(10) Patent No.: US 7,633,249 B2
(45) Date of Patent: Dec. 15, 2009

(54) POLYPHASE CURRENT SUPPLYING CIRCUIT AND DRIVING APPARATUS

(75) Inventors: Morimitsu Sekimoto, Shiga (JP); Hiroyuki Yamai, Shiga (JP)

(73) Assignee: Daikin Industries, Ltd., Osaka-shi (JP)

( * ) Notice: Subject to any disclaimer, the term of this patent is extended or adjusted under 35 U.S.C. 154(b) by 286 days.

(21) Appl. No.: 11/662,067

(22) PCT Filed: Aug. 25, 2005

(86) PCT No.: PCT/JP2005/015465

§ 371 (c)(1),
(2), (4) Date: Apr. 20, 2007

(87) PCT Pub. No.: WO2006/027959

PCT Pub. Date: Mar. 16, 2006

(65) Prior Publication Data

US 2008/0094864 A1   Apr. 24, 2008

(30) Foreign Application Priority Data

Sep. 8, 2004   (JP) .............................. 2004-260666

(51) Int. Cl.
*H02P 7/28* (2006.01)
(52) U.S. Cl. ...................................... 318/254; 318/609
(58) Field of Classification Search ................. 318/254, 318/432, 434, 801–810, 759, 721, 606, 609; 363/34–39, 43, 16, 132, 56.07, 57; 323/207, 323/239, 324
See application file for complete search history.

(56) References Cited

U.S. PATENT DOCUMENTS 4,788,485 A * 11/1988 Kawagishi et al. .......... 318/811
6,301,131 B1    10/2001 Yoshida

FOREIGN PATENT DOCUMENTS

| JP | 10-32094 A | 2/1998 |
| JP | 11-313490 A | 11/1999 |
| JP | 2000-333461 A * | 11/2000 |
| JP | 2002-272129 A | 9/2002 |
| JP | 2002-354826 A | 12/2002 |

OTHER PUBLICATIONS

Takahash, The Institute of Electrical Engineers of Japan, National Conference, 4-149, pp. 1591, (Mar. 2002), with English language translation.

* cited by examiner

*Primary Examiner*—Rajnikant B Patel
(74) *Attorney, Agent, or Firm*—Birch, Stewart, Kolasch & Birch, LLP

(57) ABSTRACT

This invention is to reduce a voltage across a smoothing capacitor in a single-phase capacitorless inverter. A smoothing circuit (15) has a smoothing capacitor (C) connected between a pair of power supply lines (L1, L2). A diode (Ds) has its anode connected to one of the power supply lines (L1) and has its cathode connected to an end of a resistor (Rs), the other end of the resistor is connected to an end of a capacitor (Cs), the other end of the capacitor is connected to the other of the power supply lines (L2). In this way, the magnitude of a rectified voltage (Vdc) across the smoothing capacitor (C) can be reduced as compared with an absence of the series connection of diode (Ds), resistor (Rs) and capacitor (Cs).

15 Claims, 13 Drawing Sheets

F I G . 2
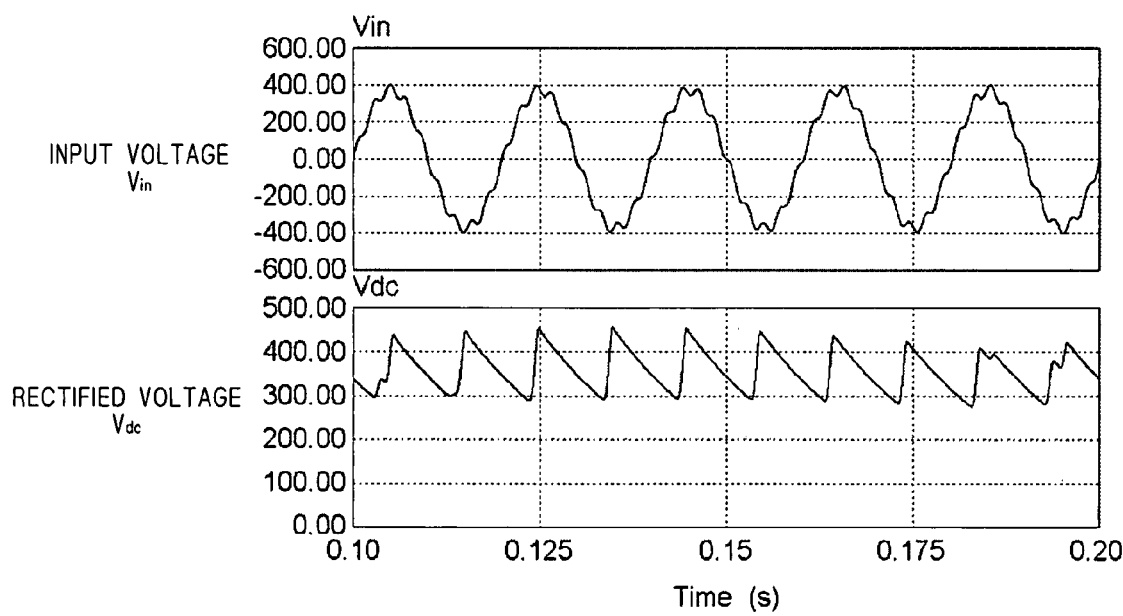
F I G . 3
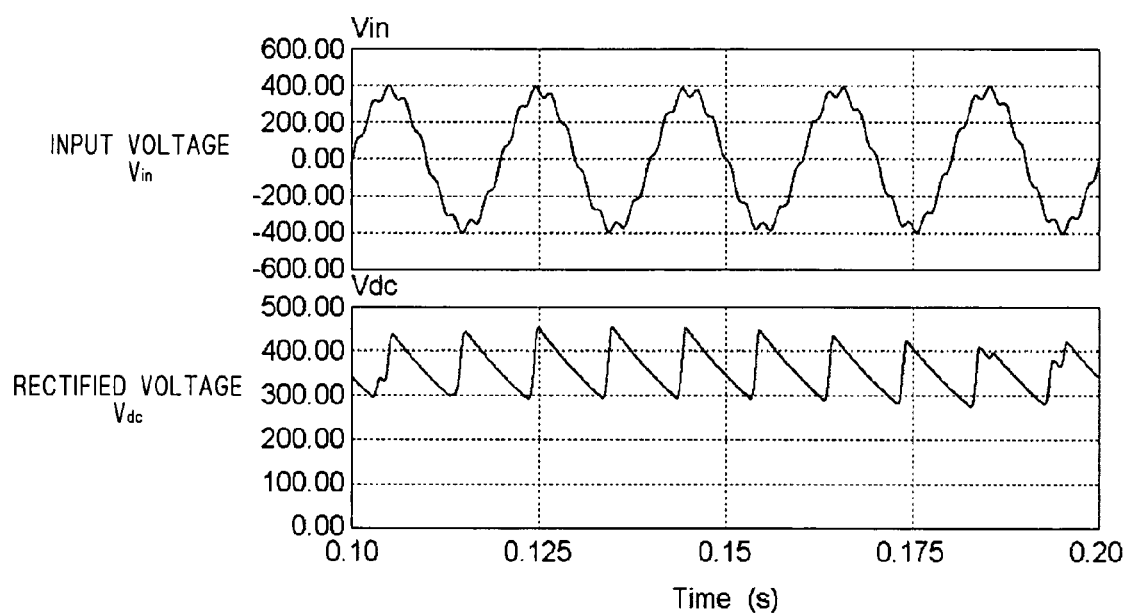

F I G . 6
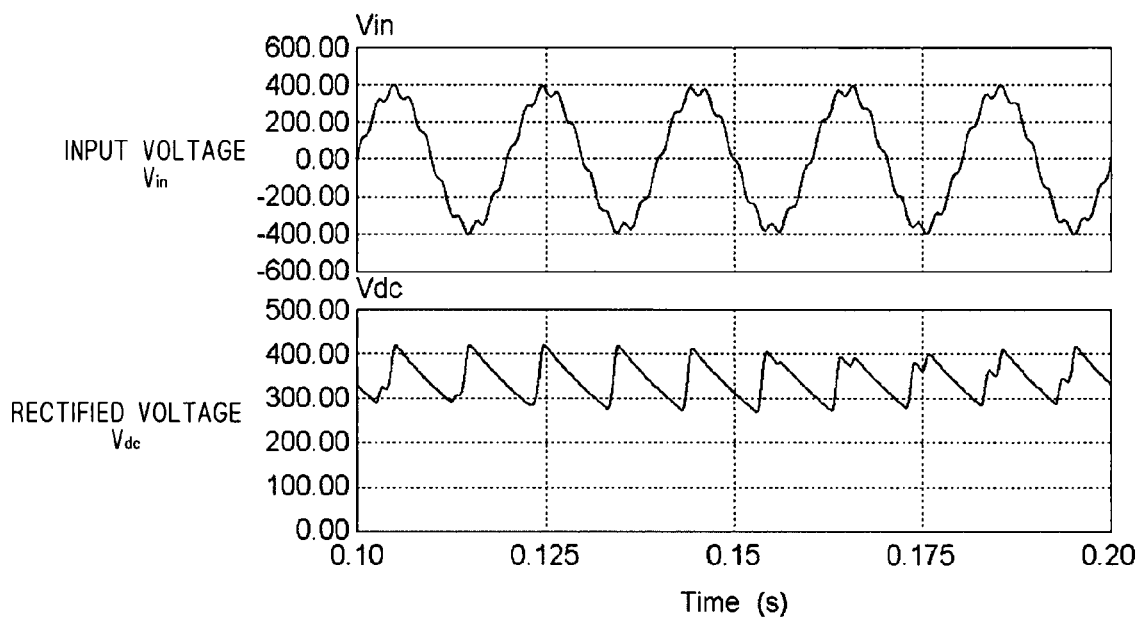
F I G . 7
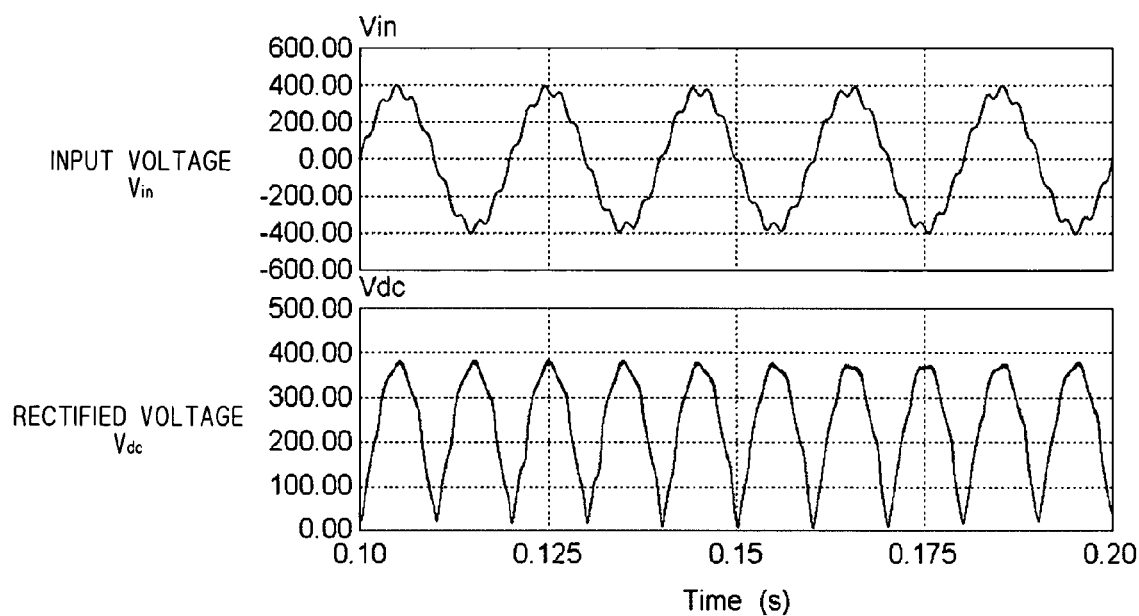

F I G . 1 2
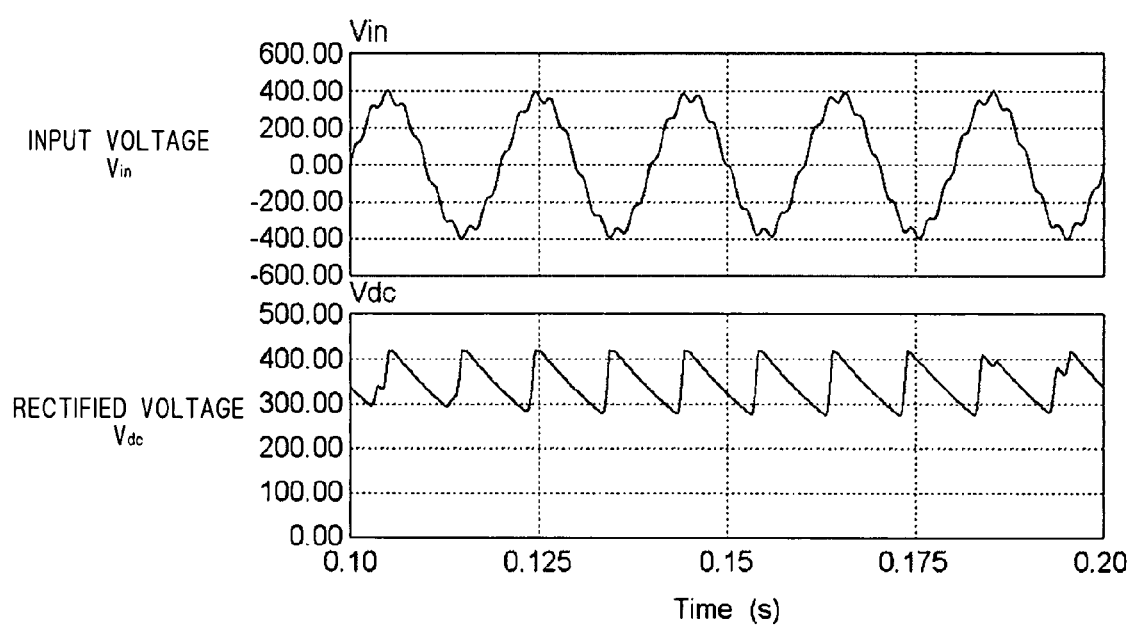

F I G . 1 4
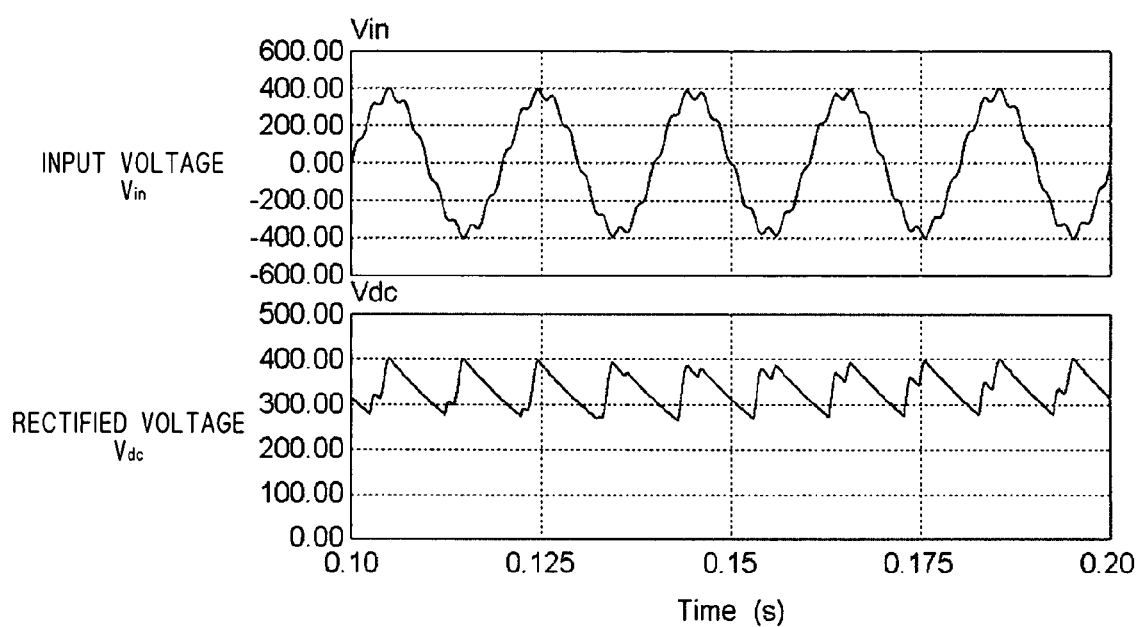

F I G . 1 6
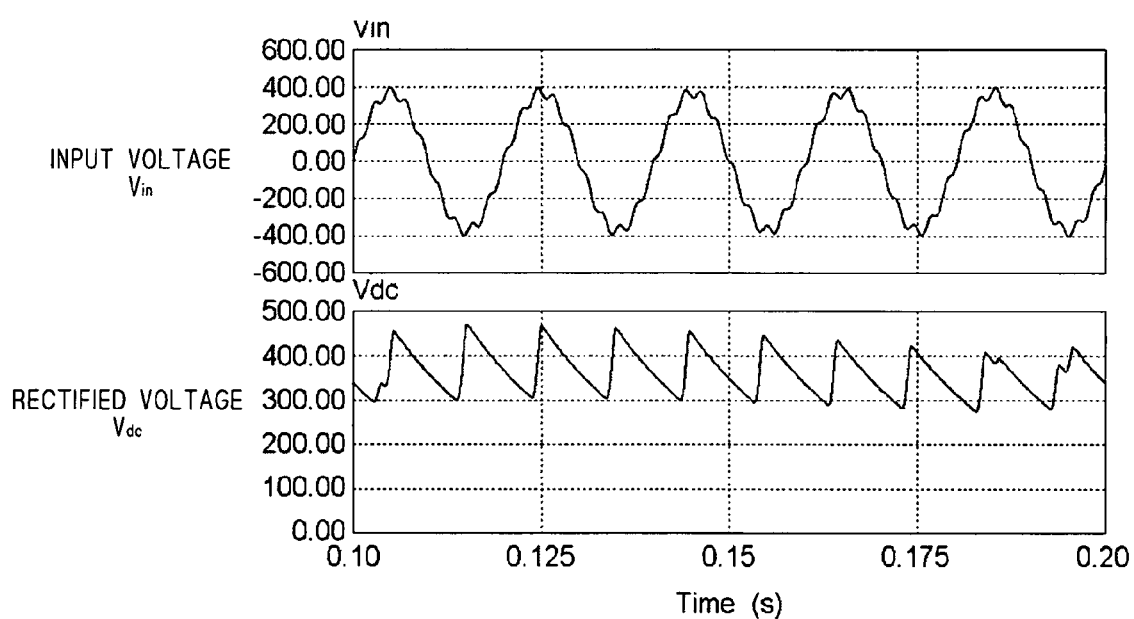

US 7,633,249 B2

POLYPHASE CURRENT SUPPLYING CIRCUIT AND DRIVING APPARATUS

TECHNICAL FIELD

This invention relates to an inverter technique.

BACKGROUND ART

FIG. 13 is a circuit diagram illustrating the configuration of a conventional polyphase current supplying circuit. A single-phase ac power supply 21 supplies an ac voltage $V_{in}$ to a diode bridge 11. However, an inductance parasitic to the power supply system is shown as an inductor 22 connected in series with the ac power supply 21.

The output of the diode bridge 11 is supplied to a smoothing circuit 12. The smoothing circuit 12 is composed only of a smoothing capacitor C having a small capacitance, e.g., several tens of microfarads. The smoothing capacitor C can be reduced in size because of its small capacitance.

A rectified voltage $V_{dc}$ obtained across the smoothing capacitor C is input to an inverter 13. In the inverter 13, switching of transistors serving as switching devices is carried out on the basis of a switching instruction CNT obtained from a control circuit 14. Accordingly, three-phase currents $i_u$, $i_v$, $i_w$ are supplied to a motor 24. The control circuit 14 obtains the switching instruction CNT on the basis of the currents $i_u$, $i_v$, $i_w$, a rotation position angle $\theta_m$ and a rotation angle speed (mechanical angle) $\omega_m$ of a rotor of the motor 24, the ac voltage $V_{in}$, and the rectified voltage $V_{dc}$ input to the inverter 13. These respective quantities $i_u$, $i_v$, $i_w$, $\theta_m$, $\omega_m$, $V_{in}$, $V_{dc}$ can be detected using a well-known technique.

FIG. 14 is a graph showing the relationship between the input voltage $V_{in}$ and rectified voltage $V_{dc}$, employing a time axis common to them on the horizontal axis. A capacitance of the smoothing capacitor C was set at 20 μF. Since the smoothing capacitor C has a small capacitance in this manner, its rectified voltage $V_{dc}$ in turn has a very large pulsating component which pulsates at twice the frequency of the ac voltage $V_{in}$. Herein, the case in which the rectified voltage $V_{dc}$ fluctuates between a little less than 300 V and a little more than 400 V is illustrated.

However, setting the switching instruction CNT as appropriate also allows control of switching in the inverter 13 in accordance with this pulsation, reduction of harmonics of current supplied from the ac power supply 21 to the diode bridge 11 and improvement in power factor on the power supply side.

A technique of controlling an inverter with a smoothing capacitor significantly reduced in capacitance in this manner will herein be called single-phase capacitorless inverter control. The single-phase capacitorless inverter control allows size reduction of a smoothing capacitor as described above as well as eliminating the necessity for using a reactor for improving the power factor, which can achieve size reduction of a polystage current supplying circuit as a whole to achieve cost reduction.

Prior art documents disclosing such single-phase capacitorless inverter control are Patent document 1 and Non-patent document 1.

Patent document 1: Japanese Patent Application Laid-Open No. 2002-354826

Non-patent document 1: Isao Takahashi "Inverter Controlling Method using PM Motor having High-Input-Power-Factor Diode Rectifier Circuit", 2002 The Institute of Electrical Engineers of Japan, National Conference, 4-149 (March 2002), p. 1591

DISCLOSURE OF INVENTION

As described above, the smoothing capacitor C employed in the single-phase capacitorless inverter control has a small capacitance. And the inductor 22 connected in series with this has an inductance of not more than a several hundreds of micro henries.

Therefore, the resonance frequency of a series resonant circuit constituted of them corresponds to harmonics of very high order, e.g., about the 30th order to 40th order as compared to the frequency of the ac voltage $V_{in}$ (several tens of hertz). The current input from the ac power supply 21 therefore has increased harmonic contents of the aforementioned orders.

For instance, regulations provided by IEC (International Electrotechnical Commission) determine the upper limit of a root-mean-square value of harmonics, and it is desirable to reduce the aforementioned harmonic contents.

As a method of reducing the harmonic contents, decreasing a series resonance frequency may be considered. FIG. 15 is a circuit diagram illustrating a polyphase current supplying circuit with a reactor K added to the smoothing circuit 12. The rector K is, in the smoothing circuit 12, inserted in series between the inductor 22 and smoothing capacitor C. Therefore, the product of the inductance and capacitance increases while the resonance frequency decreases. Since the upper limit of the root-mean-square value of harmonics is allowed to be a higher value as its frequency decreases, the reduction in resonance frequency is considered as effective means to comply with the aforementioned regulations.

However, when the series resonance frequency is decreased, a problem arises in that the peak value of the rectified voltage $V_{dc}$ is increased although the regulations on harmonics can be adhered to. This, in particular, results in a more significant problem as the ac power supply 21 is more unstable and as a distortion from the sinusoidal wave of the ac voltage $V_{in}$ increases. This is because the capacitance of the smoothing capacitor C is small as described above, and has a degraded function of smoothing the distortion from the sinusoidal wave in the smoothing capacitor.

FIG. 16 is a graph showing the relationship between the input voltage $V_{in}$ and rectified voltage $V_{dc}$ in the case where the inductance of the reactor K was set at 6 mH and the capacitance of the smoothing capacitor C was set at 20 μF, employing a time axis common to them on the horizontal axis. Simulation was run on the case in which the voltage rose by 10% while the ratings of the ac power supply 21 are 50 Hz and 240V, and further, a 460-Hz, 30V distortion voltage was superposed (it should be noted that such distortion was also employed in the simulation for obtaining the graph of FIG. 14). Further, power consumption measured 100 W. In this case, the peak value of the rectified voltage $V_{dc}$ reaches as high as 470 V.

For instance, the maximum rating of the rectified voltage $V_{dc}$ of IPM (Intelligent Power Module) used frequently as a power module of the inverter 13 is generally 500 V. And, an overvoltage protecting function of stopping switching of the inverter for protecting this IPM when the ac voltage rises to be or higher than the maximum rating is employed.

A circuit for operating this overvoltage protecting function fluctuates in voltage at which its operation is started resulting from fluctuations in its components. In light of these circumstances, it is desirable to suppress the rectified voltage $V_{dc}$ at about 450 V in order not to cause the overvoltage protecting function to be operated.

Considering in accordance with the above, there is a concern that the case of not providing the reactor K (FIG. 13, FIG.

14) prevents the overvoltage protecting function from being operated but runs counter to the harmonics regulations, and the case of providing the reactor K (FIG. 15, FIG. 16) can comply with the harmonics regulations but causes the overvoltage protecting function to be operated.

This invention has been made in view of such problems, and has an object to suppress the peak value of a rectified voltage while reducing harmonics of current supplied to a polyphase current supplying circuit when effecting the single-phase capacitorless inverter control with a smoothing capacitor significantly reduced in capacitance.

A first aspect of a polyphase current supplying circuit of this invention comprises: a diode group (11) performing full-wave rectification on an ac voltage ($V_{in}$); a smoothing circuit (15) having a smoothing capacitor (C) and outputting, in response to an output of the diode group, a rectified voltage $V_{dc}$ having pulsation at twice the frequency of the ac voltage from both ends of the smoothing capacitor (C); and an inverter (13) outputting, in response to the rectified voltage, the polyphase ac currents ($i_u$, $i_v$, $i_w$) in accordance with the pulsation. The smoothing circuit includes: a reactor (K) constituting a series resonant circuit together with the smoothing capacitor; and a peak-value suppressing device ($D_s$, $R_s$, $C_s$, $R_c$, S1; $R_L$, S2; $R_B$, Q; ZD) suppressing a peak value of the rectified voltage.

According to the first aspect of the polyphase current supplying circuit of this invention, the peak value of the rectified voltage is suppressed while reducing harmonic contents of current supplied thereto when effecting what is called single-phase capacitorless inverter control with the smoothing capacitor (C) reduced in capacitance.

A second aspect of the polyphase current supplying circuit of this invention is the polyphase current supplying circuit according to the first aspect, wherein the peak-value suppressing device includes: a diode ($D_s$) and a capacitor ($C_s$) connected in series between the pair of ends of the smoothing capacitor; and a power consuming part ($R_c$; 16) connected in parallel with the capacitor. A direction from an anode to a cathode of the diode corresponds to a direction from a high potential side to a low potential side of the smoothing capacitor (C).

According to the second aspect of the polyphase current supplying circuit of this invention, when a large amount of charges abruptly flows into the series resonant circuit, part of them is consumed by charging of the capacitor ($C_s$). This suppresses an increase in the voltage across the smoothing capacitor (C). And, even when the voltage across the capacitor ($C_s$) temporarily rises, an increase in the rectified voltage ($V_{dc}$) is avoided by the function of the diode ($D_s$). Then, the charged capacitor ($C_s$) is discharged by a power consuming element.

A third aspect of the polyphase current supplying circuit of this invention is the polyphase current supplying circuit according to the second aspect, wherein the power consuming part is a resistor ($R_c$).

According to the third aspect of the polyphase current supplying circuit of this invention, power can easily be consumed on the basis of charges stored at the capacitor ($C_s$).

A fourth aspect of the polyphase current supplying circuit of this invention is the polyphase current supplying circuit according to the second aspect, wherein the power consuming part is a power supply (16) for another circuit.

According to the fourth aspect of the polyphase current supplying circuit of this invention, power can effectively be used on the basis of charges stored at the capacitor ($C_s$).

A fifth aspect of the polyphase current supplying circuit of this invention is the polyphase current supplying circuit according to any one of the second to fourth aspects, wherein the peak-value suppressing device further includes a resistor ($R_s$) connected in series with the diode ($D_s$) and capacitor ($C_s$).

According to the fifth aspect of the polyphase current supplying circuit of this invention, an inrush current in the initial state where the capacitor ($C_s$) is little charged can be suppressed.

A sixth aspect of the polyphase current supplying circuit of this invention is the polyphase current supplying circuit according to the fifth aspect, wherein the peak-value suppressing device further includes a switch (S1) connected in parallel with the resistor ($R_s$).

According to the sixth aspect of the polyphase current supplying circuit of this invention, the switch (S1) is shorted after the steady state is obtained to make the resistance of the resistor ($R_s$) apparently zero, which can increase the effect of suppressing the peak value.

A seventh aspect of the polyphase current supplying circuit of this invention is the polyphase current supplying circuit according to the first aspect, wherein the peak-value suppressing device is connected in parallel with the reactor (K), and the peak-value suppressing device includes a resistor ($R_L$).

According to the seventh aspect of the polyphase current supplying circuit of this invention, the resistor ($R_L$) serves as damping against the resonance generated by the reactor (K) and smoothing capacitor (C), which reduces the resonance. Accordingly, abrupt charging of the smoothing capacitor (C) is avoided, which suppresses the peak value of the rectified voltage ($V_{dc}$).

An eighth aspect of the polyphase current supplying circuit of this invention is the polyphase current supplying circuit according to the seventh aspect, wherein the peak-value suppressing device further includes a switch (S2) connected in series with the resistor ($R_L$).

According to the eighth aspect of the polyphase current supplying circuit of this invention, the parallel connection between the resistor ($R_L$) and reactor (K) is disconnected in view of the fact that the function required of the resistor ($R_L$) is decreased in necessity under heavy load conditions.

A ninth aspect of the polyphase current supplying circuit of this invention is the polyphase current supplying circuit according to the first aspect, wherein the peak-value suppressing device is connected in parallel with the smoothing capacitor (C), and conducts when the rectified voltage ($V_{dc}$) exceeds a first predetermined value, and does not conduct when it falls below a second predetermined value not higher than the first predetermined value.

According to the ninth aspect of the polyphase current supplying circuit of this invention, control is exerted such that the rectified voltage ($V_{dc}$) does not exceed the first predetermined value.

A tenth aspect of the polyphase current supplying circuit of this invention is the polyphase current supplying circuit according to the ninth aspect, wherein the peak-value suppressing device includes a resistor ($R_B$) and a switch (Q) connected in series with each other. The switch is turned on when the rectified voltage ($V_{dc}$) exceeds the first predetermined value, and the switch is turned off when the rectified voltage ($V_{dc}$) falls below the second predetermined value.

According to the tenth aspect of the polyphase current supplying circuit of this invention, since the resistor ($R_B$) is connected in parallel with the smoothing capacitor (C) when the rectified voltage ($V_{dc}$) exceeds the first predetermined value, the speed of charging the smoothing capacitor (C) can be reduced, allowing the peak value of the rectified voltage ($V_{dc}$) to be suppressed.

An eleventh aspect of the polyphase current supplying circuit of this invention is the polyphase current supplying circuit according to the ninth aspect, wherein the peak-value suppressing device includes a Zener diode (ZD).

According to the eleventh aspect of the polyphase current supplying circuit of this invention, the peak-value suppressing device can be obtained with a simple configuration.

A driving apparatus according to this invention comprises: the polyphase current supplying circuit according to any one of the first through eleventh aspects; and a driving part driven in response to the polyphase ac currents ($i_u$, $i_v$, $i_w$).

In the driving apparatus according to this invention, the first through eleventh aspects of the polyphase current supplying circuit may be applied.

These and other objects, features, aspects and advantages of this invention will become more apparent from the following detailed description and accompanying drawings.

BRIEF DESCRIPTION OF DRAWINGS

[FIG. 2] is a graph showing the effects of the driving apparatus according to the first embodiment of this invention.

[FIG. 3] is a graph showing the effects of the driving apparatus according to the first embodiment of this invention.

[FIG. 6] is a graph showing the effects of the driving apparatus according to the third embodiment of this invention.

[FIG. 7] is a graph showing the effects of a conventional technique.

[FIG. 12] is a graph showing the effects of the driving apparatus according to the fifth embodiment of this invention.

[FIG. 14] is a graph showing the operation of the conventional polyphase current supplying circuit.

[FIG. 16] is a graph showing the operation of the polyphase current supplying circuit for explaining problems to be solved by the invention.

BEST MODE FOR CARRYING OUT THE INVENTION

FIRST EMBODIMENT

Figure 1:
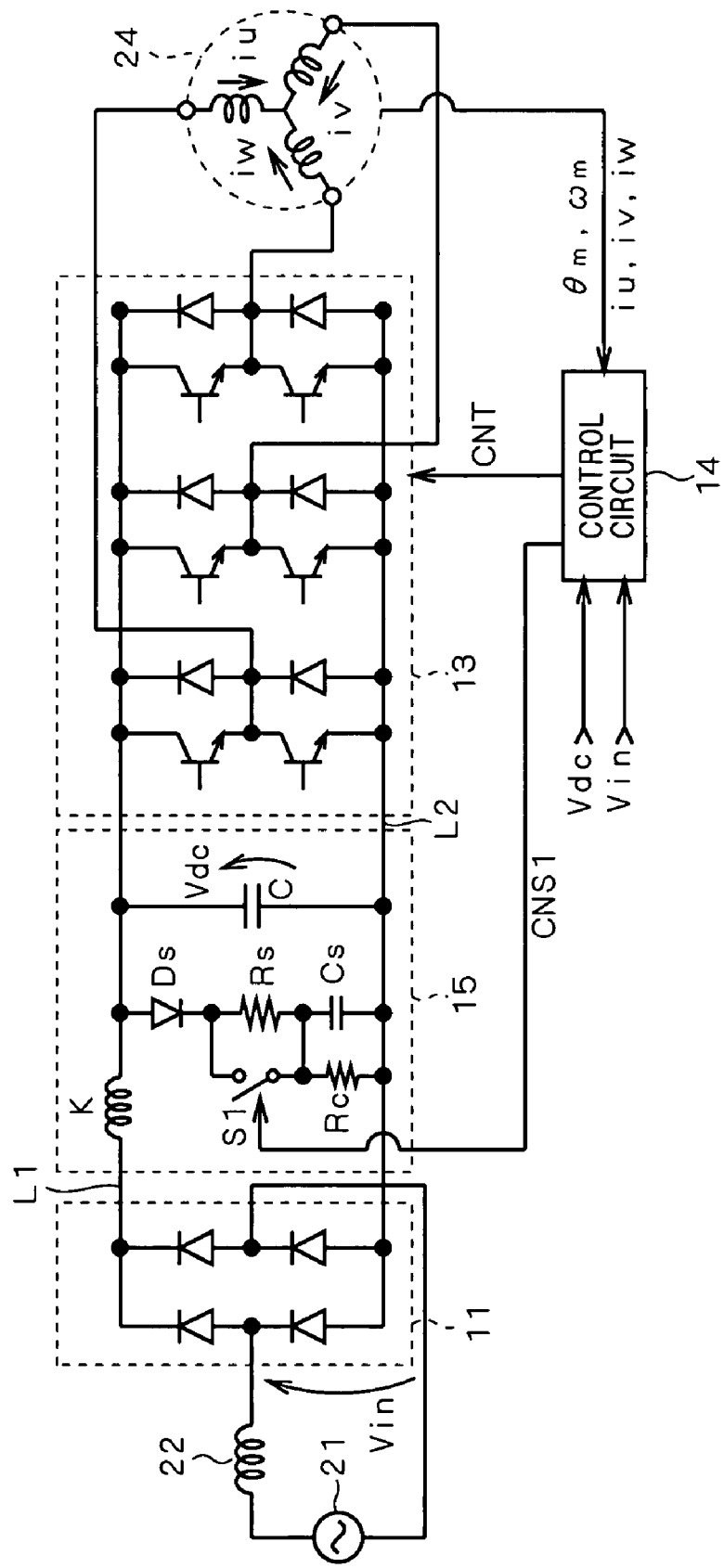
[FIG. 1] is a circuit diagram showing a driving apparatus according to a first embodiment of this invention.

FIG. 1 is a circuit diagram showing a driving apparatus according to the first embodiment of this invention. The driving apparatus is provided with a motor 24 serving as a driving part and a polyphase current supplying circuit for supplying polyphase currents thereto.

The polyphase current supplying circuit includes a diode bridge 11, a smoothing circuit 15, an inverter 13 and a control circuit 14, all of which are connected between power supply lines L1 and L2. Specifically, a single-phase ac power supply is connected to the diode bridge 11, and the diode bridge 11 performs full-wave rectification on an ac voltage $V_{in}$ and supplies it between the power supply lines L1 and L2. However, the power supply lines L1 and L2 correspond to the positive and negative polarities of voltage, respectively, and the power supply line L2 is supplied with a potential not higher than the power supply line L1. The power supply line L2 may be grounded.

The ac voltage $V_{in}$ is supplied by an ac power supply 21. However, an inductance parasitic to the power supply system exists as described above, and FIG. 1 shows this as an inductor 22 connected in series with the ac power supply 21.

The smoothing circuit 15 has a smoothing capacitor C and a reactor K connected between the power supply lines L1 and L2, similarly to the smoothing circuit 12. The reactor K is inserted in the power supply line L1 between the inductor 22 and smoothing capacitor C. The both ends of the smoothing capacitor C hold a rectified voltage $V_{dc}$ as an output from the smoothing circuit 15.

The smoothing circuit 15 further includes a diode $D_s$, a resistor $R_s$ and a capacitor $C_s$ connected in series between the power supply lines L1 and L2. Connection is made such that the direction from the anode to cathode of the diode $D_s$ corresponds to the direction from the power supply line L1 to the power supply line L2 (i.e., direction from the high potential side to the low potential side of the smoothing capacitor C), and FIG. 1 illustrates the case in which the diode $D_s$ has its anode connected to the power supply line L1 and its cathode connected to an end of the resistor $R_s$, the resistor $R_s$ has its other end connected to an end of the capacitor $C_s$, and the capacitor $C_s$ has its other end connected to the power supply line L2. It should be noted that the diode $D_s$, resistor $R_s$ and capacitor $C_s$ constituting a series circuit may be interchanged in order.

Further, a resistor $R_c$ is connected in parallel across the capacitor $C_s$, and a switch S1 is connected in parallel across the resistor $R_s$.

The inverter 13 receives the rectified voltage $V_{dc}$, and supplies three-phase currents $i_u$, $i_v$, $i_w$ to the motor 24. The inverter 13 has three transistors (upper-arm side transistors) each having a collector connected to the power supply line L1 and three transistors (lower-arm side transistors) each having an emitter connected to the power supply line L2. Each of the upper-arm side transistors is paired with each of the lower-arm side transistors in each phase. The emitter of an upper-arm side transistor and the collector of a lower-arm side transistor paired with each other are connected in common, and the currents $i_u$, $i_v$, $i_w$ are output from their connection node. On-off control of each of the upper-arm side transistors and lower-arm side transistors is exerted on the basis of a switching instruction CNT from the control circuit 14.

It should be noted that each of the upper-arm side transistors and lower-arm side transistors is provided with a free wheel diode having an anode connected to the emitter and a cathode connected to the collector in order to flow a regenerative current from the motor 24.

The control circuit 14 obtains the switching instruction CNT and an opening/closing instruction CNS1 on the basis of the currents $i_u$, $i_v$, $i_w$, a rotation position angle $\theta_m$ and a rotation angle speed $\omega_m$ of a rotor of the motor 24, the ac voltage $V_{in}$, and the rectified voltage $V_{dc}$ input to the inverter 13. These respective quantities $i_u$, $i_v$, $i_w$, $\theta_m$, $\omega_m$, $V_s$, $V_{dc}$ can be detected using a well-known technique.

Now, power consumption at the resistor $R_c$ causes charges stored at the capacitor $C_s$ to be consumed. That is, the resistor $R_c$ can be understood as a power consuming part. The speed of the power consumption is determined depending upon time constants of the capacitor $C_s$ and resistor $R_c$.

In the case where the amount of charges stored at the capacitor $C_s$ is small, the voltage thereacross is also small. Therefore, even when a large current is supplied to the power supply line L1 via the reactor K by the series resonance, charges flown into the smoothing capacitor 15 by the current are supplied to charging of the capacitor $C_s$ passing through the diode $D_s$. Since no current flows in the diode $D_s$ even when the amount of charges stored at the capacitor $C_s$ increases so that the charging voltage exceeds the rectified voltage $V_{dc}$, the voltage across the smoothing capacitor C, i.e., the rectified voltage $V_{dc}$ is less likely to rise.

As the amount of current supplied from the power supply line L1 decreases, power is consumed by the resistor $R_c$, causing the amount of charges at the capacitor $C_s$ to be decreased. This facilitates charging of the capacitor $C_s$ when the amount of current supplied from the power supply line L1 increases next, which therefore suppresses an increase in the rectified voltage $V_{dc}$.

From a different point of view, the capacitor $C_s$ is prepared with small amount of charges, and when a large amount of charges flows into the series resonant circuit via the power supply line L1, part of them is consumed by charging of the capacitor $C_s$. This suppresses an increase in the voltage across the smoothing capacitor C. And, even when the voltage across the capacitor $C_s$ temporarily rises, an increase in the rectified voltage $V_{dc}$ is avoided by the function of the diode $D_s$. Then, the charged capacitor $C_s$ is discharged by the resistor $R_c$.

FIG. 2 is a graph showing the relationship between the input voltage $V_{in}$ and rectified voltage $V_{dc}$ in the case where the resistances of the resistors $R_s$ and $R_c$ were set at 12Ω and 20 kΩ, respectively, and the capacitance of the capacitor $C_s$ was set at 47 μF under conditions similar to the simulation shown in FIG. 16, employing a time axis common to them on the horizontal axis. The peak value of the rectified voltage $V_{dc}$ could be suppressed at as low as 450 V.

As understood from the above description of operation, the resistor $R_s$ is not always necessary, and may rather have a resistance value of zero for controlling its peak value. On the other hand, in the initial state where the ac voltage $V_{in}$ is applied to the polyphase current supplying circuit, the capacitor $C_s$ is little charged, which may cause an inrush current to be input. It is therefore desirable in the initial point of time to open the switch S1 to make the function of the resistor $R_s$ effective, and on the other hand, to short the switch S1 after the steady state is obtained to make the resistance of the resistor $R_s$ apparently zero. Such opening/closing control of the switch S1 is effected on the basis of the above-described opening/closing instruction CNS1.

FIG. 3 is a graph showing the results of simulation in the case where the resistance of the resistor $R_s$ was set at zero. As compared to the results of FIG. 2, the peak value of the rectified voltage $V_{dc}$ is smaller by about 5 V.

Accordingly, the opening/closing of the switch S1 can achieve suppression of inrush current and suppression of peak value of the rectified voltage $V_{dc}$ on the basis of the difference of the initial state and steady state.

SECOND EMBODIMENT

Employing the resistor $R_c$ as the power consuming part, power can easily be consumed on the basis of charges stored at the capacitor $C_s$ by heat dissipation. However, a power supply for another circuit may be employed as the power consuming part. This is one embodiment of an effective use of power.

Figure 4:
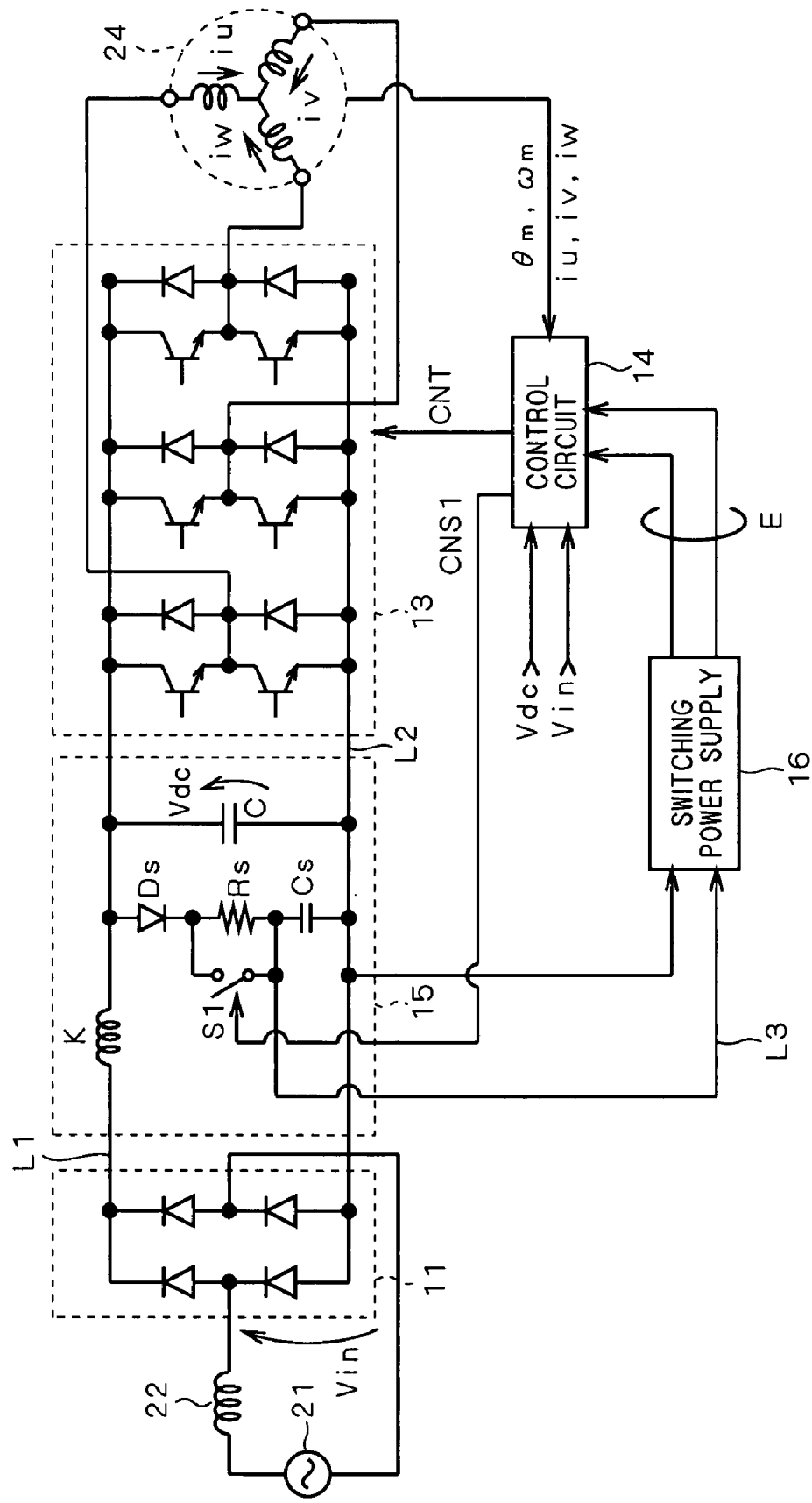
[FIG. 4] is a circuit diagram showing the configuration of a polyphase current supplying circuit according to a second embodiment of this invention.

FIG. 4 is a circuit diagram showing the configuration of a polyphase current supplying circuit according to the second embodiment of this invention. The case of employing a switching power supply 16 serving as a power supply for the control circuit 14 in place of the resistor $R_c$ described in the first embodiment is illustrated.

Specifically, the voltage across the capacitor $C_s$ is supplied to the switching power supply 16 for the control circuit 14. For instance, a power supply line L3 is connected to an end of the capacitor $C_s$, and the power supply lines L2 and L3 are connected to the switching power supply 16. The switching power supply 16 supplies an voltage E to the control circuit 14 on the basis of power supplied from the power supply lines L2 and L3. Since the switching power supply 16 outputs a small output of about 10 W, the smoothing function can be obtained to a degree that the switching power supply 16 requires even when employing a value of about 20 μF as the capacitor $C_s$.

Since charges are drawn from the both ends of the capacitor $C_s$ via the power supply lines L2 and L3, the voltage thereacross is reduced. Accordingly, the diode $D_s$ conducts within an appropriate conducting range in accordance with the consumption power of the control circuit 14, even after the capacitor $C_s$ is charged before the inverter control by the control circuit 14 is started to make the diode $D_s$ once non-conducting. This conduction of the diode $D_s$ causes current to flow into the resistor $R_s$, however, its root-mean-square value is small at about several tens of milliamperes, causing a loss of about 50 mV, which is not disadvantage particularly in current control and efficiency in the capacitorless inverter control for driving a motor of several hundreds of watts (motor current is 1 A or more).

Since the rectified voltage $V_{dc}$ pulsates significantly in conventional single-phase capacitorless inverter control, it has been difficult to obtain a dc power to be supplied to the control circuit 14 based on this. It has therefore been necessary to additionally provide a rectifier circuit for constituting a switching power supply for a control circuit employed in the conventional single-phase capacitorless inverter control. According to this embodiment, however, it is not necessary to additionally provide a dc constant voltage power supply for operating the control circuit 14, while obtaining the effects of the first embodiment.

THIRD EMBODIMENT

Figure 5:
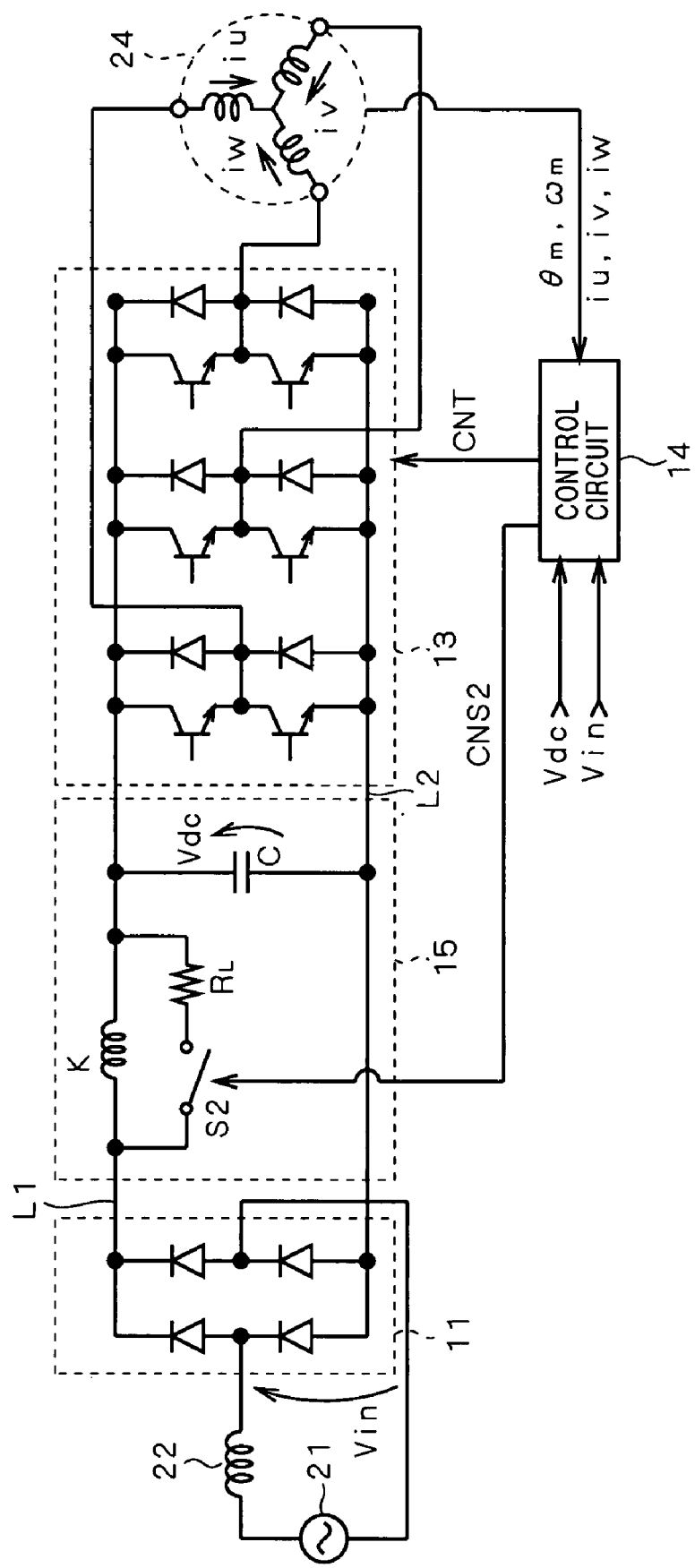
[FIG. 5] is a circuit diagram showing a driving apparatus according to a third embodiment of this invention.

FIG. 5 is a circuit diagram showing a driving apparatus according to the third embodiment of this invention. As compared to the driving apparatus according to the first embodiment, the smoothing circuit 15 has a different configuration. That is, the smoothing circuit 15 according to the third embodiment is configured by adding a series connection of a switch S2 and a resistor $R_L$ to the smoothing circuit 12 shown in FIG. 15. The series connection is connected in parallel with the reactor K.

Turning on the switch S2 causes the resistor $R_L$ to be connected in parallel with the reactor K, while turning off the switch S2 causes this parallel connection to be disconnected.

In the case where the resistor $R_L$ is connected in parallel with the reactor K, the resistor $R_L$ exercises the damping function against the resonance generated by the reactor K and smoothing capacitor C, which reduces the resonance. Accordingly, abrupt charging of the smoothing capacitor C is avoided, which suppresses the peak value of the rectified voltage $V_{dc}$. FIG. 6 is a graph showing the results of simulation in the case where the resistance of the resistor $R_L$ was set at 20Ω and the switch S2 was turned on in the configuration of the smoothing circuit 15, and other conditions were set similarly to the simulation shown in FIG. 16. The peak value of the rectified voltage $V_{dc}$ was suppressed at 425 V.

Figure 15:
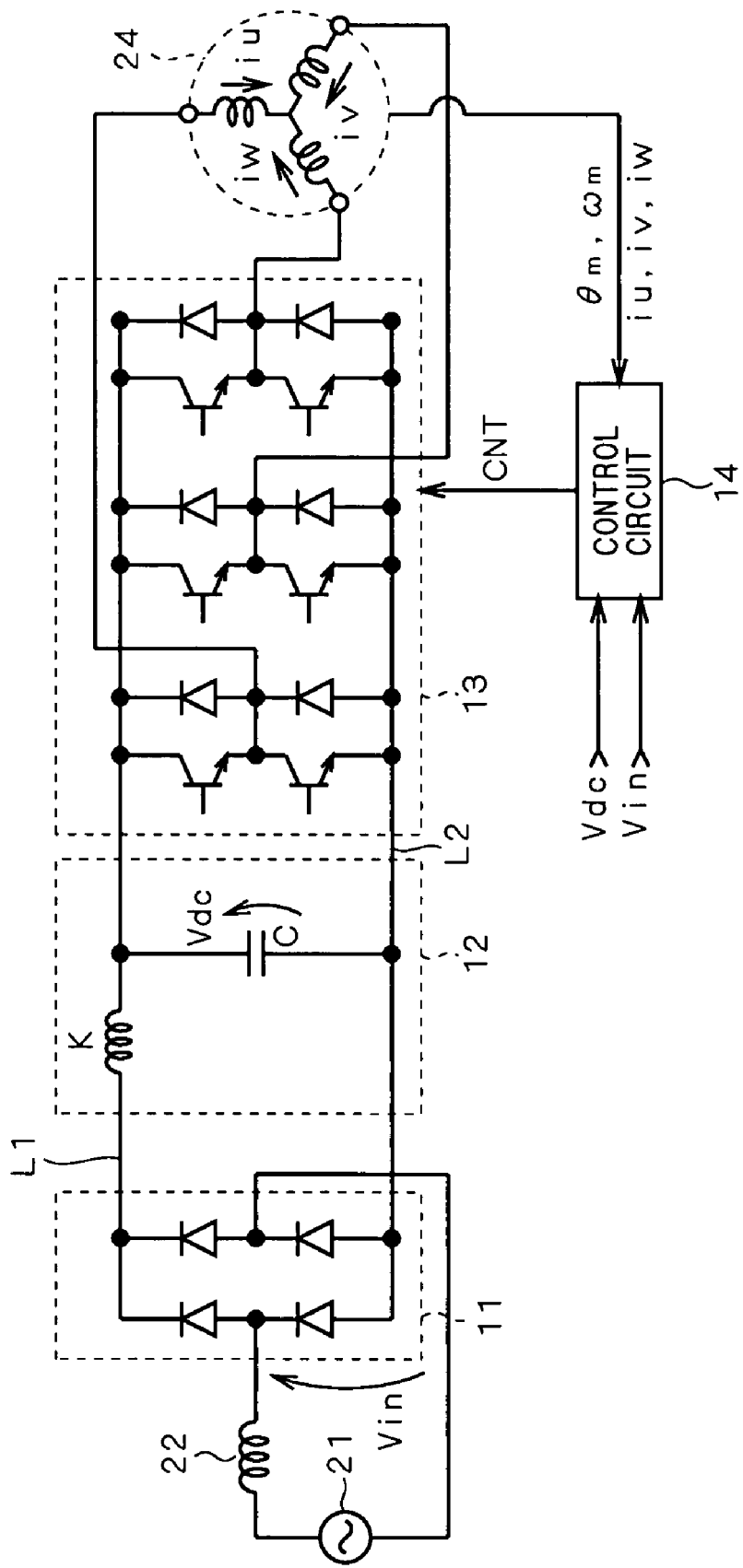
[FIG. 15] is a circuit diagram illustrating the configuration of a polyphase current supplying circuit for explaining problems to be solved by the invention.

FIG. 7 is a graph showing the results of simulation in the case where the switch S2 was turned off, that is, when the smoothing circuit 12 shown in FIG. 15 was used, and the power consumption measured 1 kW. In such case where the power consumption is high, the amount of charges consumed from the smoothing capacitor C to the inverter 13 is large, thus causing the fluctuations in the rectified voltage $V_{dc}$ to be wide and the fluctuations in the rectified voltage $V_{dc}$ by the dc resonance to be relatively narrow. And, the peak value of the rectified voltage $V_{dc}$ does not reach as low as 400 V. In other words, in view of the fact that the function required of the resistor $R_L$ is decreased in necessity under heavy load conditions, the parallel connection between the resistor and reactor is disconnected. Accordingly, unnecessary power consumption at the resistor $R_L$ can be avoided.

It is therefore desirable to short the switch S2 in the condition where power consumption is low and to open the switch S2 when the power consumption is increased. FIG. 5 illustrates an embodiment in which the opening/closing of such switch S2 is controlled by an opening/closing instruction CNS2 output by the control circuit 14. The control circuit 14 monitors the currents $i_u$, $i_v$, $i_w$, rotation position angle $\theta_m$ and rotation angle speed $\omega_m$, and is therefore capable of judging high or low of power consumption, and therefore, the opening/closing instruction CNS2 can be easily generated.

For instance, in the case of employing the motor 24 for rotational driving of a compressor of an air conditioner, such switching of the switch S2 is an important operational control. The switch S2 is once shorted at startup when the number of revolutions is small, and thereafter, the switch S2 is opened when increasing the number of revolutions so that the temperature to be controlled by the air conditioner quickly approaches a target value. Further, thereafter, after the temperature is adjusted to be close to an appropriate value, an operation with reduced number of revolutions is conducted. In this case, the switch S2 is shorted again.

FOURTH EMBODIMENT

Figure 8:
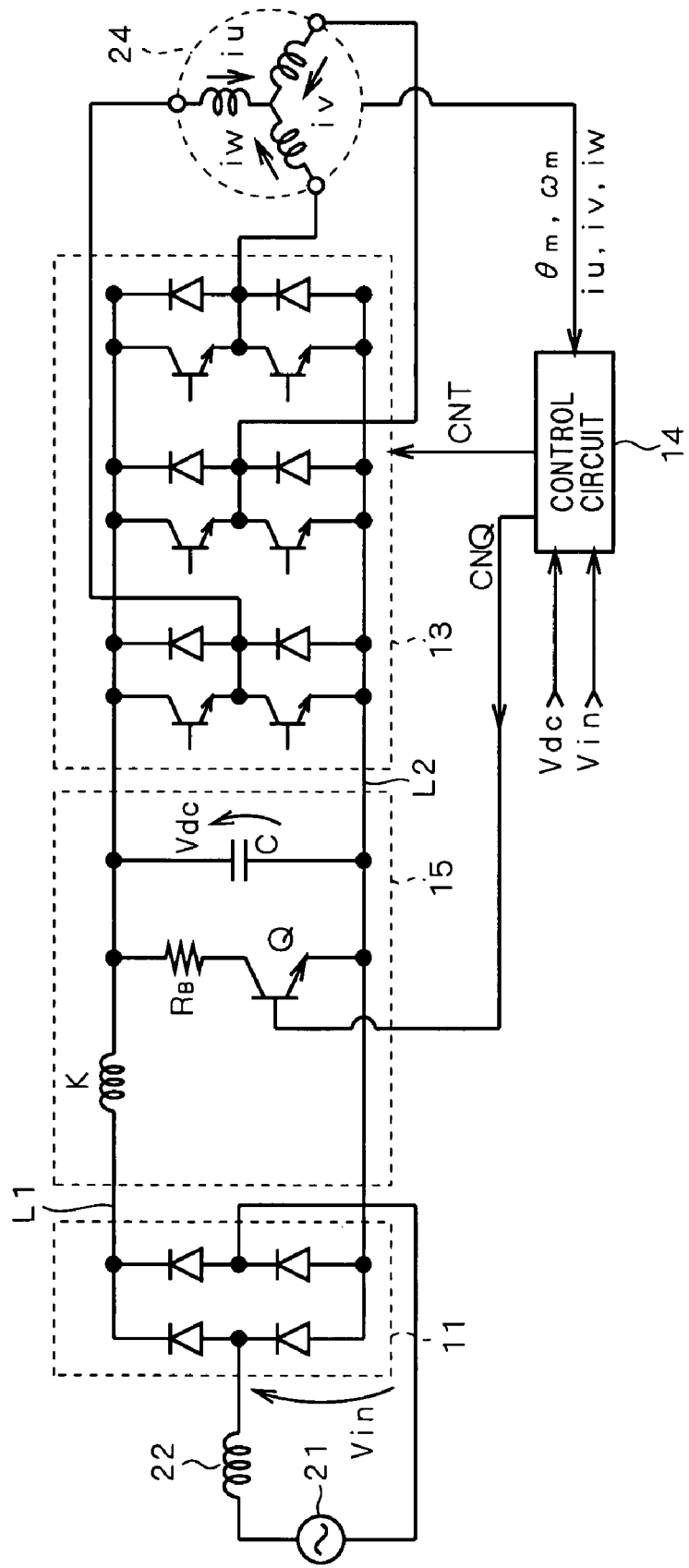
[FIG. 8] is a circuit diagram showing a driving apparatus according to a fourth embodiment of this invention.

FIG. 8 is a circuit diagram showing a driving apparatus according to the fourth embodiment of this invention. As compared to the driving apparatus according to the first embodiment, the smoothing circuit 15 has a different configuration. That is, the smoothing circuit 15 according to the fourth embodiment is configured by adding a series connection of a transistor Q serving as a switching device and a base resistor $R_B$ to the smoothing circuit 12 shown in FIG. 15. The series connection is connected in parallel with the smoothing capacitor C.

The control circuit 14 supplies a bias voltage CNQ to the base of the transistor Q on the basis of the rectified voltage $V_{dc}$. When the rectified voltage $V_{dc}$ exceeds a first predetermined value, the transistor Q is turned on, and when the rectified voltage $V_{dc}$ falls below a second predetermined value (this is lower than the first predetermined value), the transistor Q is turned off. Since the resistor $R_B$ is connected in parallel with the smoothing capacitor C in this manner when the rectified voltage $V_{dc}$ exceeds the first predetermined value, the speed of charging of the smoothing capacitor C can be reduced, allowing the peak value of the rectified voltage $V_{dc}$ to be suppressed.

Figure 9:
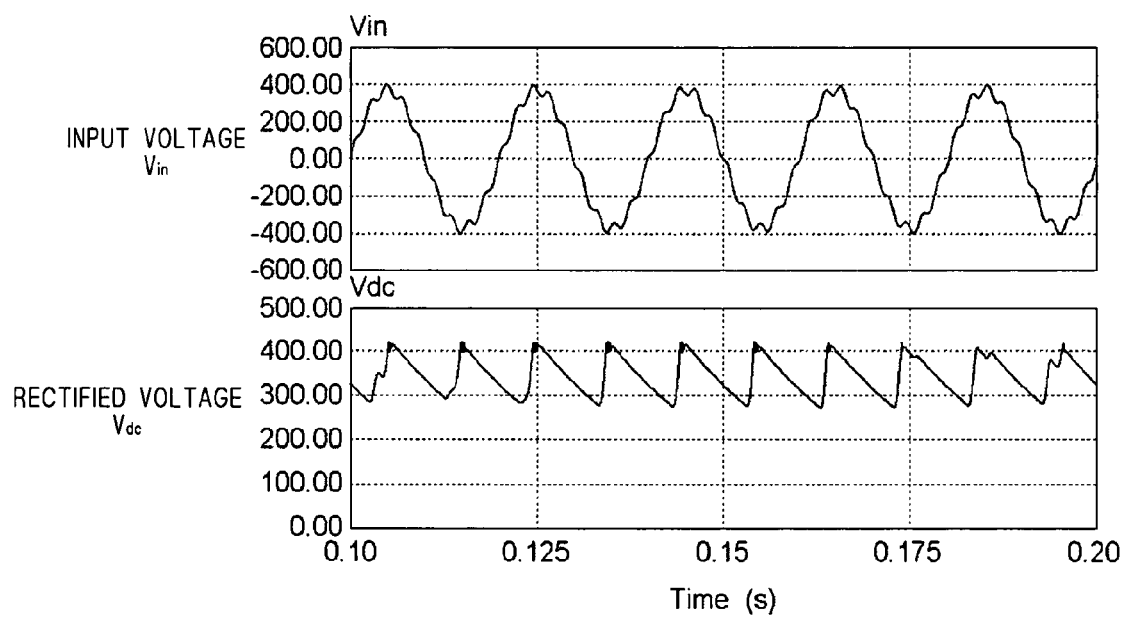
[FIG. 9] is a graph showing the effects of the driving apparatus according to the fourth embodiment of this invention.

FIG. 9 is a graph showing the results of simulation in the case where the first and second predetermined values were set at 420 V and 400 V, respectively, and the resistance of the resistor $R_B$ was set at 15Ω in the configuration of the smoothing circuit 15, and other conditions were set similarly to the simulation shown in FIG. 16.

Figure 10:
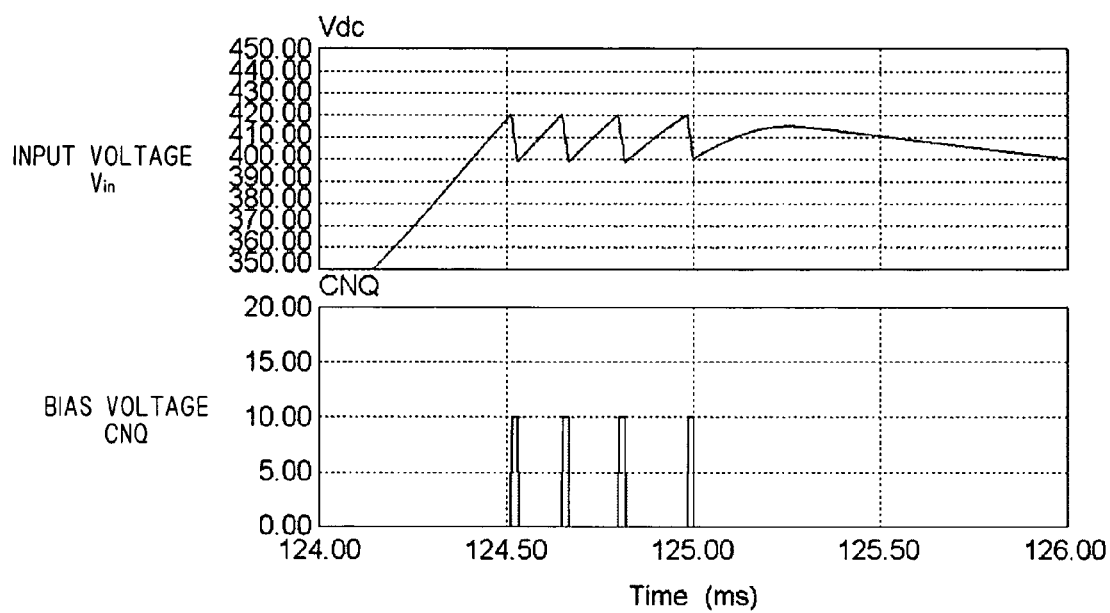
[FIG. 10] is a graph showing the effects of the driving apparatus according to the fourth embodiment of this invention.

FIG. 10 is a graph showing the relationship between the bias voltage CNQ and rectified voltage $V_{dc}$, employing a time axis common to them on the horizontal axis. When the rectified voltage $V_{dc}$ rises to 420 V, the bias voltage CNQ becomes 10 V to turn on the transistor Q, and when the rectified voltage $V_{dc}$ falls down to 400 V, the bias voltage CNQ becomes 0 V to turn off the transistor Q. Accordingly, the peak value of the rectified voltage $V_{dc}$ was suppressed at 420 V.

FIFTH EMBODIMENT

Figure 11:
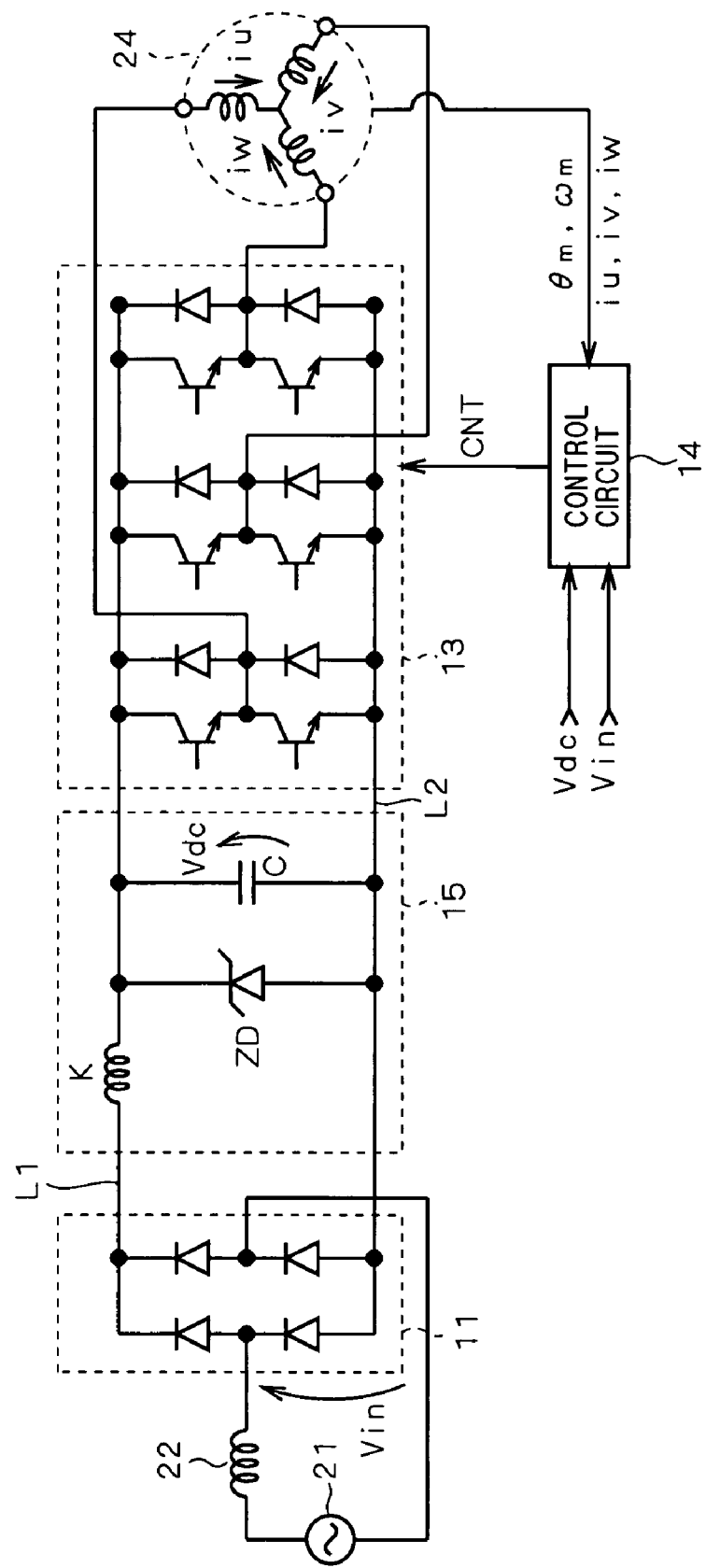
[FIG. 11] is a circuit diagram showing a driving apparatus according to a fifth embodiment of this invention.
Figure 13:
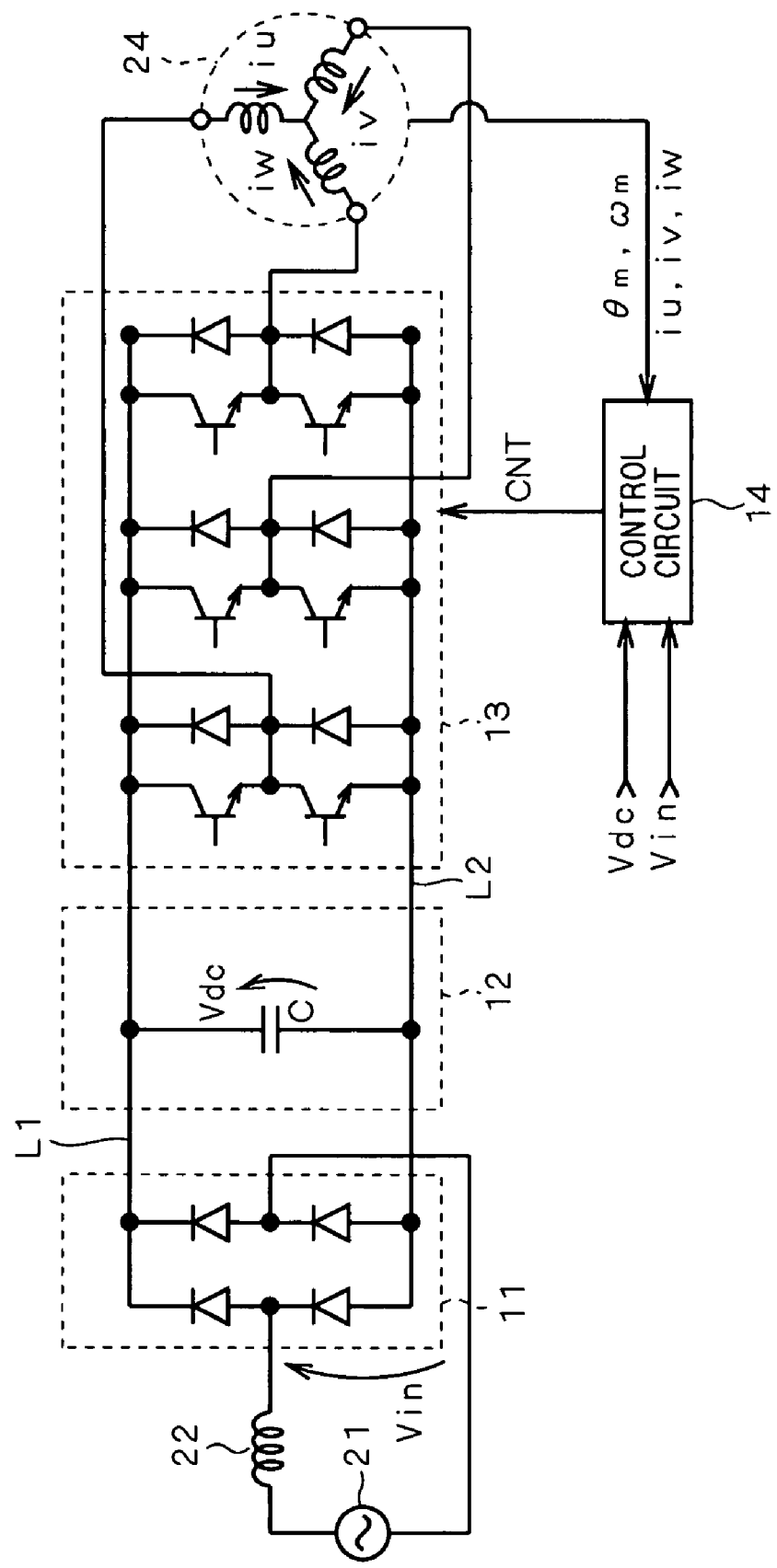
[FIG. 13] is a circuit diagram illustrating the configuration of a conventional polyphase current supplying circuit.

FIG. 11 is a circuit diagram showing a driving apparatus according to the fifth embodiment of this invention. As compared to the driving apparatus according to the first embodiment, the smoothing circuit 15 has a different configuration. That is, the smoothing circuit 15 according to the fifth embodiment is configured by adding a Zener diode ZD serving as a switching device to the smoothing circuit 12 shown in FIG. 15. The Zener diode ZD is connected in parallel with the smoothing capacitor C.

Since the rectified voltage $V_{dc}$ is applied to the Zener diode ZD, the Zener diode ZD conducts when the rectified voltage $V_{dc}$ exceeds a Zener voltage. Therefore, the speed of charging of the smoothing capacitor C can be reduced, allowing the peak value of the rectified voltage $V_{dc}$ to be suppressed.

FIG. 12 is a graph showing the results of simulation in the case where the Zener voltage was set at 420 V in the configuration of the smoothing circuit 15, and other conditions were set similarly to the simulation shown in FIG. 16. The peak value of the rectified voltage $V_{dc}$ was suppressed at 400 V.

In this embodiment, a device for suppressing the peak value can be obtained with a configuration simpler than in the fourth embodiment.

While the invention has been described in detail, the foregoing description is in all aspects illustrative, and this invention is not limited thereto. It is understood that numerous modifications and variations not illustrated can be devised without departing from the scope of the invention.

The invention claimed is:

1. A polyphase current supplying circuit comprising:
   a diode group performing full-wave rectification on an ac voltage;
   a smoothing circuit having a smoothing capacitor and outputting, in response to an output of said diode group, a rectified voltage having pulsation at twice a frequency of said ac voltage from both ends of said smoothing capacitor; and an inverter outputting, in response to said rectified voltage, polyphase ac currents in accordance with said pulsation, wherein said smoothing circuit includes:

a reactor constituting a series resonant circuit together with said smoothing capacitor; and a peak-value suppressing device suppressing a peak value of said rectified voltage across the smoothing capacitor.

2. The polyphase current supplying circuit according to claim 1, wherein said peak-value suppressing device includes:

a diode and a capacitor connected in series between the pair of ends of said smoothing capacitor; and a power consuming part connected in parallel with said capacitor, and wherein a direction from an anode to a cathode of said diode corresponds to a direction from a high potential side to a low potential side of said smoothing capacitor.

3. The polyphase current supplying circuit according to claim 2, wherein said power consuming part is a resistor.

4. The polyphase current supplying circuit according to claim 2, wherein said power consuming part is a power supply for another circuit.

5. The polyphase current supplying circuit according to claim 2, wherein said peak-value suppressing device further includes a resistor connected in series with said diode and capacitor.

6. The polyphase current supplying circuit according to claim 5, wherein said peak-value suppressing device further includes a switch connected in parallel with said resistor.

7. The polyphase current supplying circuit according to claim 1, wherein said peak-value suppressing device is connected in parallel with said reactor, and said peak-value suppressing device includes a resistor.

8. The polyphase current supplying circuit according to claim 7, wherein said peak-value suppressing device further includes a switch connected in series with said resistor.

9. The polyphase current supplying circuit according to claim 1, wherein said peak-value suppressing device is connected in parallel with said smoothing capacitor, and conducts when said rectified voltage exceeds a first predetermined value, and does not conduct when it falls below a second predetermined value not higher than said first predetermined value.

10. The polyphase current supplying circuit according to claim 9, wherein said peak-value suppressing device includes a resistor and a switch connected in series with each other, said switch is turned on when said rectified voltage exceeds said first predetermined value, and said switch is turned off when said rectified voltage falls below said second predetermined value.

11. The polyphase current supplying circuit according to claim 9, wherein said peak-value suppressing device includes a Zener diode.

12. A driving apparatus comprising: the polyphase current supplying circuit according to claim 1; and a driving part driven in response to said polyphase ac currents.

13. A driving apparatus comprising: the polyphase current supplying circuit according to claim 2; and a driving part driven in response to said polyphase ac currents.

14. A driving apparatus comprising: the polyphase current supplying circuit according to claim 7; and a driving part driven in response to said polyphase ac currents.

15. A driving apparatus comprising: the polyphase current supplying circuit according to claim 9; and a driving part driven in response to said polyphase ac currents.

* * * * *